United States Patent
Dross (10) Patent No.: US 10,451,776 B2
(45) Date of Patent: Oct. 22, 2019

(54) OPTICAL BEAM SHAPING DEVICE AND SPOT LIGHT USING THE SAME

(71) Applicant: SIGNIFY HOLDING B.V., Eindhoven (NL)

(72) Inventor: Oliver Dross, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/563,665

(22) PCT Filed: Mar. 29, 2016

(86) PCT No.: PCT/EP2016/056833
§ 371 (c)(1),
(2) Date: Oct. 2, 2017

(87) PCT Pub. No.: WO2016/156339
PCT Pub. Date: Oct. 6, 2016

(65) Prior Publication Data
US 2018/0074232 A1    Mar. 15, 2018

(30) Foreign Application Priority Data
Apr. 2, 2015   (EP) .................... 15162327

(51) Int. Cl.
*G02B 3/08* (2006.01)
*F21V 5/04* (2006.01)
(Continued)

(52) U.S. Cl.
CPC ............... *G02B 3/08* (2013.01); *F21V 5/045* (2013.01); *F21V 7/0091* (2013.01);
(Continued)

(58) Field of Classification Search
CPC .. G02B 3/08; G02B 19/0014; G02B 19/0061; G02B 27/0927; G02B 27/0972; F21V 5/045; F21V 7/0091
(Continued)

(56) References Cited

U.S. PATENT DOCUMENTS 7,800,840 B2    9/2010 Shyn et al.
2004/0141323 A1*  7/2004 Aynie .................... F21V 7/0091
                                                  362/308

(Continued)

FOREIGN PATENT DOCUMENTS

JP      2011228177 A    11/2011
WO   WO2007017833 A1    2/2007

*Primary Examiner* — James R Greece
(74) *Attorney, Agent, or Firm* — Akarsh P. Belagodu (57) ABSTRACT

An optical device that allows the usage of an extended light source in a more compact device is provided. The optical device may be configured to collimate light of a light source (270) along an optical direction. The optical device (200) may comprise a source surface (215), a forward surface (210), a lens body (250) and a peripheral element (240). The source surface is arranged to receive light and may comprise a central portion (220) and a Fresnel portion (230). The Fresnel portion includes at least one tooth (233n) for deflecting light. The forward surface is arranged to output, along the optical direction, at least the deflected light into a collimated light. The source surface and the forward surface delimit the lens body. The peripheral element may be arranged to reflect light internally reflected at the forward surface by total inner reflection towards the optical direction to contribute to the collimated light.

20 Claims, 5 Drawing Sheets

(51) Int. Cl.

| | |
|---|---|
| *G02B 19/00* | (2006.01) |
| *F21V 7/00* | (2006.01) |
| *G02B 27/09* | (2006.01) |
| *F21Y 115/30* | (2016.01) |
| *F21Y 105/10* | (2016.01) |
| *F21Y 115/10* | (2016.01) |
| *F24S 23/30* | (2018.01) |

(52) U.S. Cl.
CPC ..... *G02B 19/0014* (2013.01); *G02B 19/0061* (2013.01); *G02B 27/0927* (2013.01); *G02B 27/0972* (2013.01); *F21Y 2105/10* (2016.08); *F21Y 2115/10* (2016.08); *F21Y 2115/30* (2016.08); *F24S 23/31* (2018.05)

(58) Field of Classification Search
USPC ........................................................ 359/742
See application file for complete search history.

(56) References Cited

U.S. PATENT DOCUMENTS

| | | | |
|---|---|---|---|
| 2006/0044806 A1 | 3/2006 | Abramov et al. | |
| 2010/0228119 A1* | 9/2010 | Brennan | A61B 5/0066 |
| | | | 600/424 |
| 2011/0061721 A1* | 3/2011 | Chen | G02B 3/08 |
| | | | 136/252 |
| 2014/0355273 A1 | 12/2014 | Saito | |

* cited by examiner

OPTICAL BEAM SHAPING DEVICE AND SPOT LIGHT USING THE SAME

CROSS-REFERENCE TO PRIOR APPLICATIONS

This application is the U.S. National Phase application under 35 U.S.C. § 371 of International Application No. PCT/EP2016/056833, filed on Mar. 29, 2016, which claims the benefit of European Patent Application No. 15162327.9, filed on Apr. 2, 2015. These applications are hereby incorporated by reference herein.

TECHNICAL FIELD

The present specification generally relates to the field of Fresnel lenses and particularly discloses an optical device for utilizing an extended light source.

TECHNICAL BACKGROUND

Generally, total inner reflection Fresnel (TIRF) lenses are compact and efficient collimators. To provide a lighting device with a higher intensity and/or a more robust construction, it is desirable to use an extended light source in combination with such TIRF lenses. However, standard TIRF-lenses are optimized for point-like sources. When utilizing an extended light source, normal designs are unable to control all light. This leads to light leakage which in turn results in a reduction of efficiency and beam intensity.

Thus, there is a need for improvement of a TIRF-lens for directing light from an extended light source.

US 2011/0061721 describes a non-imaging lens with a Fresnel type of structure, that is a structure with triangles with a given distribution of angles.

US 2004/0141323 describes an indicator lamp comprising a light source and a coaxial annular reflector with a structured inner surface.

SUMMARY

An object of the present invention is to provide an optical device that allows the usage of an extended light source which at least partly overcomes some of the problems stated above.

In particular, it is an object to provide a more compact optical device suitable for a wider span of applications.

Traditional solutions to this problem results in a much thicker lens, thus reducing the usefullness of those solutions.

The above-mentioned objects are achieved by the present invention according to the independent claim. Preferred embodiments are set forth in the dependent claims.

For example, in one embodiment an optical device is configured to collimate light of a light source along an optical direction. The optical device may comprise a source surface, a forward surface, a lens body and a peripheral element. The source surface is arranged to receive light and may comprise a central portion and a Fresnel portion. The Fresnel portion includes at least one tooth for deflecting light. The forward surface is arranged to output, along the optical direction, at least the deflected light into a collimated light. The source surface and the forward surface delimits the lens body. The peripheral element may be arranged to reflect light internally reflected by total inner reflection at the forward surface towards the optical direction to contribute to the collimated light.

In the above embodiment, it has been realized that a total inner reflection Fresnel (TIRF) lens can be more efficient, with less dependence on the position or size of a light source, by providing a peripheral element that reflects back, towards the optical direction of the optical device, light internally reflected within the lens body and which, otherwise, would have been lost. Thus, more light can be output from the optical device. In other words, the optical device provides a collimated output beam of higher intensity.

It will be appreciated that a Fresnel part of a TIRF lens may be constructed from several concentric annular sections, wherein in general the sections have two parts, namely a first part directed towards a center of the lens and a second part directed towards an edge of the lens. In a TIRF lens, the first part is arranged more in parallel with an optical axis of the lens than the second part. Looking at a cross section along a radial direction of such a Fresnel part, the sections will have a jagged appearance with several teeth extending from the lens. Hence, the term "tooth" can be seen as the cross section of a concentric annular section.

Light emitted from a centered light source towards a Fresnel part of a TIRF lens will first reach the first part of a tooth. At a surface of the first part of a tooth (i.e. an interface between the tooth and a medium outside the lens body, often ambient air), the light will be refracted into the lens and directed (within the lens body) towards the second part of a tooth. At a surface of the second part of a tooth, the light will be reflected (within the lens body) by total inner reflection and directed towards a forward surface. At the forward surface, the light will be emitted as a part of an output beam (i.e. a beam of light output from the optical device).

A part of the light emitted from a non-centered light source towards a Fresnel part of a TIRF lens will first reach the first part of a tooth. At a surface of the first part of the tooth, the light will be refracted into the lens body and directed towards the forward surface, thus not passing through the second part. At the forward surface (i.e. an interface between the froward surface and outside a medium outside the lens body, often ambient air), the light will be reflected by total inner reflection and directed towards the peripheral element. At the peripheral element, the light is reflected such that it is directed along the optical direction, in order to be added to the light reflected at the teeth as a part of the output beam.

Using prior art TIRF lens and a non-centered light source, or an extended light source (as part of the extended light source would then be not centered with the TIRF lens), part of the light (i.e. the light not passing through the second part) would be lost. Thus, the peripheral element increases the amount of light contributing to the collimated beam and a more efficient optical device can be achieved.

An optical device according to the above embodiment is advantageous in that it is more efficient in outputting collimated light from a light source, and in particular an extended light source (in the sense that it is not a point-like source) or a source not aligned with the centre of the TIRIF lens, while still providing a more compact device. In the optical device, part of the light is directed by the peripheral element.

In one embodiment, the central portion may be arranged to collimate light of a light source along an optical direction by at least one of refraction and reflection.

In another embodiment, the central portion may be a flat surface or similar, hence arranged to let light pass through the device without collimation.

It will be appreciated that the central portion may comprise at least one Fresnel tooth. In one embodiment, the central portion may be or may act as a Fresnel portion.

In one embodiment, the peripheral element may be arranged to reflect light internally reflected at the forward surface by total inner reflection within the lens body. Fewer components may be used in this design while still providing an improved device by utilizing total inner reflection at the peripheral element to collimate light in the device. This design may also result in a more efficient manufacturing of the device.

For this purpose, in one embodiment, the peripheral element may be configured to reflect light having been deflected, without total inner reflection, at the Fresnel portion and reflected at the forward surface.

The term "TIR" in the present disclosure means total inner reflection, which occurs when propagating light strikes a medium boundary at an angle larger than a critical angle with respect to the normal of the boundary surface.

The term "output beam" in the present disclosure means light output from the optical device during its intended usage.

The term "optical direction" in the present disclosure means the direction in which an optical device, element or portion is arranged to operate, i.e. direct light. In some embodiments, but not always, the optical direction may coincide with an axial direction along which the lens body extend. In other words, the optical direction may be a direction coinciding with, or parallel to, a symmetry axis of the optical device, element or portion.

The term "forward surface" in the present disclosure means a surface (of the optical device) facing away from a light source, arranged to output light (e.g. towards a target or scene).

The term "source surface" in the present disclosure means a surface facing a source, such as a source of light.

The term "lens body" in the present disclosure means a body (having a volume) with refractive properties. As mentioned above, the lens body may be delimited by the forward surface at one side and the source surface at an opposite side. As such, the distance between the source surface and the forward surface may define the thickness of the lens body (which may vary along a radial direction, depending on the shape of the forward surface and the source surface). In some embodiments, the optical device may therefore also be defined to include a lens body having a forward surface at one side and a source surface at an opposite side.

The term "tooth" in the present disclosure refers to two sloped walls, or inclined walls, meeting or intersecting at a point defining a tip of the tooth. A tooth may extend out from, or into, a surface. The Fresnel portion may therefore be seen as a series of intersecting sloped (or inclined) walls defining a certain number of tips, i.e. a certain number of teeth.

In one embodiment, the Fresnel portion may be radially located, relative to the optical direction, between the central portion and the peripheral element. In a particular embodiment, the central portion may be located towards a centre of the device, the peripheral element may be located towards an edge of the device and the Fresnel portion may be located between the central portion and the peripheral element.

In these embodiments, the central portion may be a regular refractive optical arrangement for focusing light from both a small and an extended source in a suitable way. The Fresnel portion may be used where a regular lens may be too thick or unsuitable in any other way. The peripheral element may then at least partly correct some imperfections introduced by the Fresnel portion.

In one embodiment, the peripheral element may further comprise a metalized surface configured to reflect light along the optical direction, which results in an improved efficiency of the device. Further, the reflecting properties of a metalized surface do not depend on an angle of incidence. Hence, the present embodiment provides a more robust design. A metalized surface may be made of any reflecting metal. As non limiting examples, the metal used for metallization of the surface may be aluminium, copper, brass, silver or chrome. The metal layer may be obtained by vapour deposition, sputtering or any other suitable method for depositing a metal.

In one embodiment, the peripheral element may be an integrated part of the lens body. This design results in a device with fewer components, which also simplifies the manufacturing process. To achieve this, the lens body may extend radially relative to the optical direction to incorporate (i.e. enclose or encapsulate) the peripheral element. Light reaching the peripheral element in a generally radial direction from the interior of the lens body will therefore continue to propagate within the device until it is output from the forward surface along the optical direction.

In one embodiment, said peripheral element may be external to the lens body. This embodiment provides some flexibility in that the lens body may be made smaller in a radial direction. To achieve this, the peripheral element may for example be protruding from the lens body or may also be a separate component, a part of the fitting for the lens body or any other suitable construction.

In one embodiment, the peripheral element may comprise grooves arranged to reflect light internally reflected at the forward surface by total inner reflection within the lens body. This design may also result in a more robust device, utilizing total internal reflection at the peripheral element. Grooves may for example be arranged in a direction parallel to the radial direction of the optical device, such that light reaching grooves will have another angle of incidence than light reaching a similar planar (i.e. without grooves) surface. Hence total internal reflection can be ensured. Light will undergo two reflections from two side surfaces that each groove comprises. Hence, the design and placement of the grooves may be utilized to tune the performance of the device. In an example, the two groove surfaces together may be arranged to resemble the behaviour of a single reflection of a metallized surface. In another more specific example, the side surfaces may be essentially perpendicular to each other.

In one embodiment, the Fresnel portion may comprise at least one tooth having a truncated part. This design provides a simplified manufacturing process, performed for an example, by injection moulding. Having teeth that are truncated or cut off results in less sharp tips, which in turn reduces the demands on tool making and manufacturing. In prior art designs, the use of truncated teeth could lead to light not hitting any TIR-part of the tooth (or Fresnel portion), thereby resulting in loss of light in the collimated beam. With the peripheral element, such light (that would have been lost) is recovered, thereby providing the possibility of using truncated teeth or at least reducing the demands on the shape of the teeth.

In one embodiment, at least one truncated tooth may be located into the lens body. With the use of a peripheral element which "catches" or recovers light not directed by the Fresnel portion along the optical direction and which redirects this light along the optical direction, less constraints may be placed on the Fresnel portion and/or the central portion. Thus, the Fresnel portion may for example comprise one or more truncated teeth, which provides a thinner device, yet still reducing loss of light.

In one embodiment, the source surface may further comprise a convex portion that may be radially arranged relative to the optical direction between the central portion and the Fresnel portion. The convex portion may be arranged to collimate light of a light source along a second optical direction that is separate from the optical direction as defined by the direction at which the central portion is arranged to direct light. Light from a light source entering a lens body closer to the optical axis will be more divergent than light entering a lens body closer to the edge. With a flat surface, this divergence remains even after refraction. Such light may be lost by multiple internal reflections, which results in a lower efficiency. In the case of an optical device according to the present embodiment, light entering a lens body through a Fresnel surface (or Fresnel portion) close to the optical axis will diverge within the lens. In order to compensate for this behaviour, a convex portion may be used to achieve a converged propagation of light within the lens. Such converging light can be directed to the forward surface at which it is reflected, and thereafter, with the use of a peripheral element, be directed into the collimated output beam. With such a convex portion, the distribution and intensity of the output beam may be tuned.

In one embodiment, the light collimated along the second optical direction is reflected against the forward surface and at the peripheral element. With the present embodiment, a narrower output beam of higher intensity is obtained. Divergent light is directed by the convex portion inside the device in an internally more collimated beam and may be reflected at the forward surface and the peripheral element in a more focused beam.

In a further embodiment, a lighting device comprising an optical device and a light source is provided. The optical device may correspond to any one of the optical devices defined in the preceding examples or embodiments. The light source may be any kind of light source such as, for example, one from the group of a light emitting diode (LED), a organic light emitting diode (OLED), a compact fuorescent lamp (CFL), an incandescent light and a halogen light source.

In one embodiment, the light source may be located closer to the source surface than the forward surface of the optical device.

It will be appreciated that other embodiments using all possible combinations of features recited in the above described embodiments may be envisaged.

SHORT DESCRIPTION OF THE APPENDED DRAWINGS

The invention is described in the following illustrative and non-limiting detailed description of exemplary embodiments, with reference to the appended drawings, wherein.

All figures are schematic, not necessarily to scale, and generally only show parts which are necessary in order to elucidate the invention, wherein other parts may be omitted or merely suggested. Throughout the figures the same reference signs designate the same, or essentially the same features.

DETAILED DESCRIPTION

Exemplifying embodiments will now be described more fully hereinafter with reference to the accompanying drawings, in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1A:
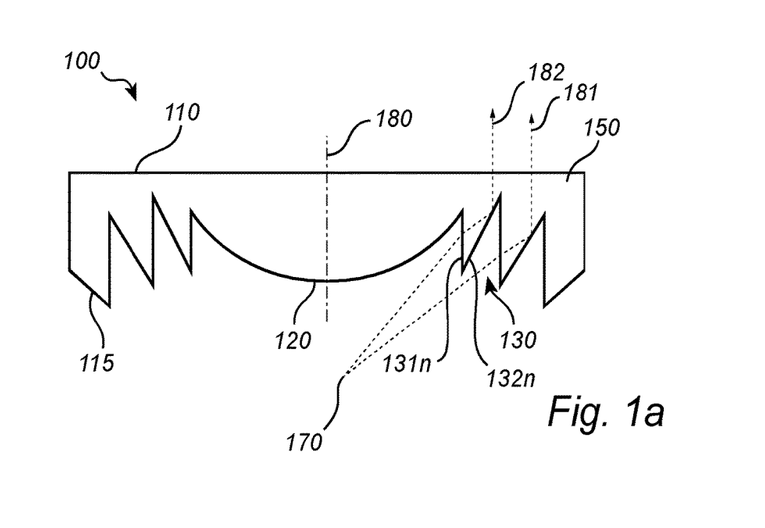
FIG. 1a is a schematic illustration and ray trace of a system utilizing a TIRF lens and a centred light source according to prior art.
Figure 1B:
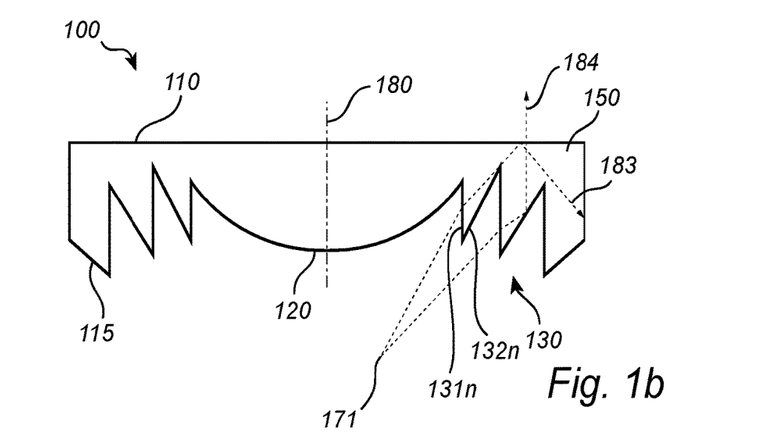
FIG. 1b is a schematic illustration and ray trace of a system utilizing a TIRF lens and a non-centred light source according to prior art.

The invention is described in the following illustrative and non-limiting detailed description of exemplary embodiments, with reference to the appended drawings, wherein:

With reference to FIGS. 1a and b, a prior art system comprising a TIR Fresnel lens and a centred light source is described.

FIG. 1a shows a schematic illustration of a Fresnel lens 100 with light rays traced for explanatory purposes. A light source 170 is positioned in a centered position, i.e. at a centre position relative to the lens 100. In other words, the light source is positioned along an axis corresponding to an axial direction along which the lens 100 extends. Alternatively, FIG. 1a may be considered to represent a point of an extended light source, wherein the point is located at a centre position relative to the Fresnel lens. The illustrated lens 100 has two surfaces that delimit a lens body 150, namely a first surface 115 facing the light source 170 and a second surface 110 facing away from the light source 170. The first surface 115 is illustrated with two portions, a central portion 120 centred at the optical axis 180 (along which the lens body extends or, in other words, extending through the middle of the lens 100 along the axial direction) and a Fresnel portion 130 arranged radially outwards (relative to the optical direction) from the central portion 120. The central portion 120 is illustrated as a convex surface. The Fresnel portion 130 is in the present cross-section illustrated by a jagged appearance with several teeth extending from the lens. One tooth provides two surfaces, a first surface 131n of a tooth facing the axis 180 of the lens and a second surface 132n of a tooth facing the edge of the lens. The first surface 131n of a tooth is illustrated as parallellparallel with the optical axis 180 (but will in practice exhibit a certain draft angle, such as e.g. two degrees or in the range of a few degrees) and the second surface 132n of a tooth is illustrated as leaning with respect to the optical axis 180. Light (or light rays) 181, 182 emitted from the light source 170 may reach a Fresnel part 130 of the Fresnel lens at a first surface 131n of a tooth at which it refracts into the lens body 150. The light is then reflected by total inner reflection at a second surface 132n of the tooth, if the tooth is seen as being formed by the walls or surfaces 131n and 132n (in which case the tooth is pointing out from the lens body). It will be appreciated that the surface 132n may also be considered to be part of the next tooth if the teeth considered to be pointing inside the lens body, the same considerations applying to the other figures too. After internal reflection, the light reaches the first surface 110 where it is output as a collimated light beam.

FIG. 1b shows a schematic illustration of an optical device 100 with light rays traced for explanatory purposes. The optical device 100 shown in FIG. 1b is equivalent to the Fresnel lens 100 described with reference to FIG. 1a except that the light source 171 is positioned at a non-centered position, i.e. at a position not aligned with the optical direction of the lens 100. The new location of the light source 171 results in that light rays 183, 184 emitted from the light source 171 behave in two different ways. A first ray 184 behaves according to the illustration of FIG. 1a and the above description. A second ray 183 reaches a Fresnel part 130 of the Fresnel lens at a first surface 131n of a tooth at which it refracts into the lens body 150 in a direction towards the forward surface, thus not passing through the second surface 132n of a tooth. In other words, the part of the second ray 183 refracted at the first surface 131n does not intersect the second surface 132n of the tooth). At the forward surface 110, the extension of the light ray 183 is reflected by total inner reflection and directed internally to the edge of the device. Such reflected light from the light ray 183 does not contribute to the collimated light beam.

Figure 2A:
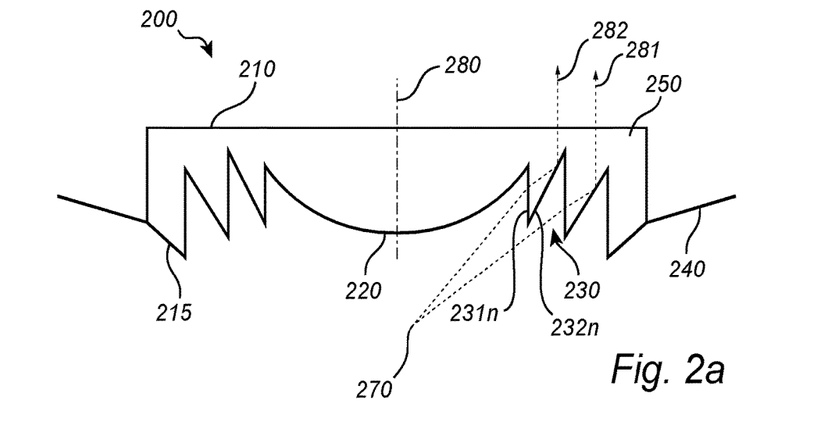
FIG. 2a is a schematic illustration and ray trace of a device utilizing a TIRF lens and a centred light source according to an embodiment.

FIG. 2a shows a schematic illustration of an optical device 200 with light rays traced for explanatory purposes.

The optical device 200 shown in FIG. 2 is equivalent to the Fresnel lens 100 described with reference to FIG. 1 except that it further comprises a peripheral element 240. The optical device 200 comprises two surfaces that delimit a lens body 250, namely a first surface (also called the source surface) 215 facing the light source 270 and a second surface (also called the forward surface in the following) 210 facing away from the light source 270. The first surface 215 is illustrated with two portions, a central portion 220 centred at the optical axis 280 (along which the lens body extends or, in other words, extending through the middle of the device 200, along the axial direction) and a Fresnel portion 230 arranged radially outwards (relative to the optical direction) from the central portion 220. The central portion 220 is illustrated as a convex surface.

The Fresnel portion 230 is in the present cross-section illustrated by a jagged appearance with several teeth extending from the lens. A tooth may be defined by two surfaces, a first surface 231n of a tooth facing the axis 280 of the lens and a second surface 232n of a tooth facing the edge of the lens. The first surface 231n of a tooth is illustrated as parallellparallel with the optical axis 280 (but will in practice exhibit a certain draft angle, such as e.g. two degrees or in the range of a few degrees) and the second surface 232n of a tooth is illustrated as leaning with respect to the optical axis 280.

Further, FIG. 2 shows a peripheral element 240 protruding from the lens body 250 in a radial direction (possibly with a certain angle relative to a plane perpendicular to the optical axis 280). The peripheral element 240 may include a metalized surface or any other means for providing reflection.

The propagation of the light rays denoted 281, 282 in FIG. 2a is equivalent to the propagation of the light rays denoted 181, 182 described with reference to FIG. 1a. Briefly, light rays 281, 282 (or light emitted) from the light source 270 reaches a Fresnel part 230 of the Fresnel lens at a first surface 231n of a tooth at which it refracts into the lens body 250. The light is then reflected by total inner reflection at the second surface 232n of the tooth. After internal reflection the light reaches the forward surface 210 where it is output as a collimated light beam.

Figure 2B:
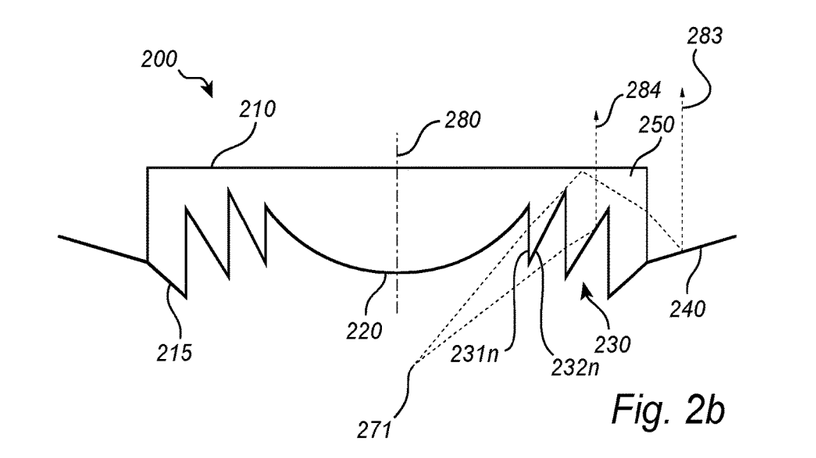
FIG. 2b is a schematic illustration and ray trace of a device utilizing a TIRF lens and a non-centred light source according to an embodiment.

FIG. 2b shows a schematic illustration of an optical device 200 with light rays traced for explanatory purposes.

The optical device 200 shown in FIG. 2b is equivalent to the optical device 200 described with reference to FIG. 2a except that the light source 271 is positioned in a non-centered position, i.e. at a position not coinciding with the optical axis 280 of the device 200. The new location of the light source 271 results in that light rays 283, 284 emitted from the light source 271 behave in two different ways. A first ray denoted 284 propagates according to the illustration shown in FIG. 2a.

A second ray denoted 283 reaches a Fresnel part 230 of the Fresnel lens at a first surface 231n of a tooth at which it refracts into the lens body 250 in a direction towards the forward surface 210, thus not passing through the second surface 232n of the tooth. At the forward surface 210, light of the light ray 283 is reflected by total inner reflection and directed towards the peripheral element 240. At the peripheral element 240 the light 283 is reflected to coincide with the light reflected at the teeth, which together form a collimated output beam.

With the peripheral element 240, an extended or misaligned light source 271 may be used, while still collimating the light as illustrated in FIG. 2b. Further, the peripheral element 240 may be straight (planar), curved or have any other shape suitable for directing light into the collimated output beam of the optical device 200. In the present embodiment, the peripheral element 240 is arranged external to the lens body 250.

Figure 3:
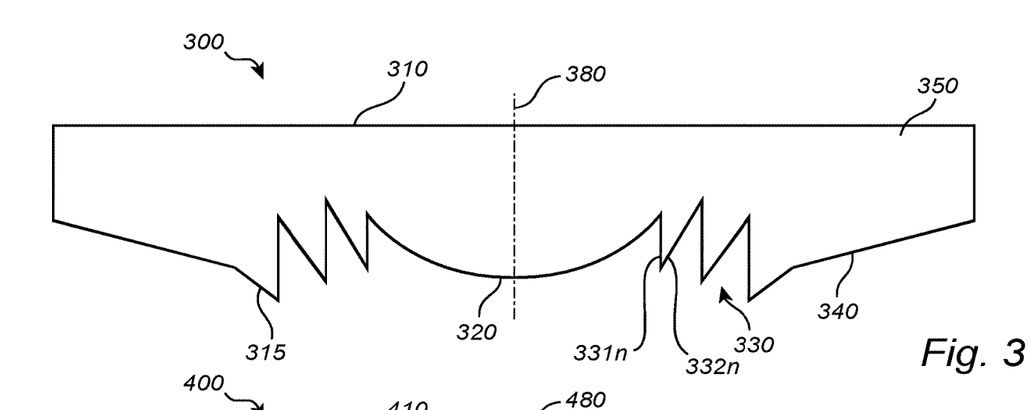
FIG. 3 is a schematic illustration of an optical device in which the peripheral element is an integrated part of the lens body in accordance with an embodiment.

FIG. 3 shows a schematic illustration of an optical device 300, in accordance with another embodiment.

The illustrated device 300 has two opposing surfaces that delimit a lens body 350, i.e. a first surface 315 and a second surface 310. The first surface 315 is illustrated with three portions, a central portion 320, a Fresnel portion 330 and a peripheral element 340. In the present embodiment, the central portion 320, the Fresnel portion 330 and the peripheral element 340 are integrated parts of the lens body 350. The central portion is centred at an optical axis 380 along which light is output from the device, i.e. at a direction extending through the middle of the device 300 (or in other words, along an axial direction along which the lens body extends). The Fresnel portion 330 is arranged radially outwards from the central portion 320 and the peripheral element 340 is arranged radially outwards from the Fresnel portion 330. For the purpose of illustration, the central portion 320 is depicted as a convex surface.

The Fresnel portion 330 is in the present cross section illustrated by a jagged appearance with several teeth extending from the lens. A tooth provides two surfaces, namely a first surface 331n of a tooth facing the axis 380 of the lens and a second surface 332n of a tooth facing the edge of the lens. The first surface 331n of a tooth is illustrated as parallellparallel (or approximately parallel) with the optical axis 380 and the second surface 332n of a tooth is illustrated as leaning with respect to the optical axis 380. The peripheral element 340 is illustrated as an extension of the second surface 310 in a radial direction. The source surface of 340 may be metallized or may comprise radial grooves to provide reflection. In particular, the peripheral element is arranged towards the first surface 315 at an angle from a plane perpendicular to the optical axis 380.

Figure 4:
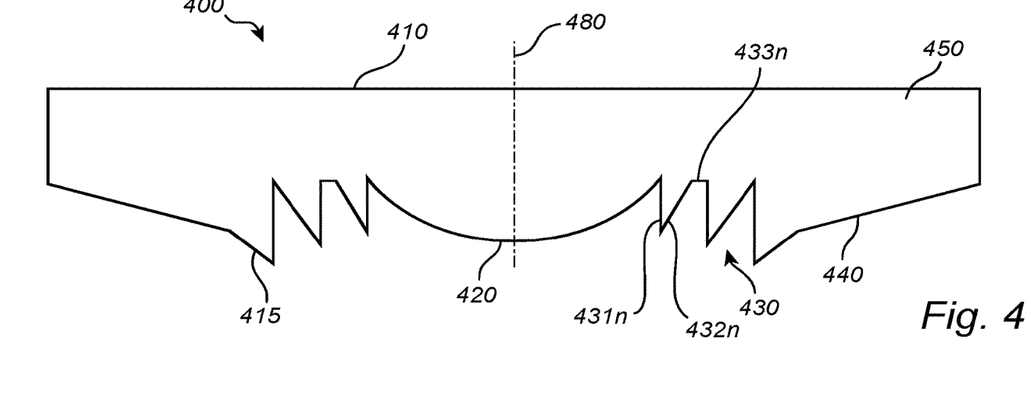
FIG. 4 is a schematic illustration of an optical device in which the Fresnel portion comprises a tooth having a truncated part and being located into the lens body, in accordance with an embodiment.

FIG. 4 shows a schematic illustration of an optical device, in accordance with another embodiment.

The optical device 400 shown in FIG. 4 is equivalent to the Fresnel lens 300 described with reference to FIG. 3 except that within the Fresnel portion 430 one tooth 433n is truncated. The illustrated optical device 400 has two opposing surfaces that delimit a lens body 450, a first surface 415 and a second surface 410. The first surface 415 is illustrated with three portions, a central portion 420 centred at the optical axis 480 of the device a Fresnel portion 430 arranged radially outwards from the central portion 420 and a peripheral element 440 arranged radially outwards from the Fresnel portion 430. The central portion 420 is illustrated as a convex surface.

The Fresnel portion 430 is in the present cross section illustrated by a jagged appearance with several teeth extending from the lens. A tooth provides two surfaces, a first surface 431n of a tooth facing the axis 480 of the lens and a second surface 432n of the tooth facing the edge of the lens. The first surface 431n of the tooth is illustrated as parallellparallel (or approximately parallel) with the optical axis 480 and the second surface 432n of the tooth is illustrated as leaning with respect to the optical axis 480. The illustrated truncation 433n of the tooth is replacing a tip of the tooth (or at a part of the tooth located into the lens body 450). Hence, the second surface 432n of one tooth and the first surface 431n+1 of the tooth next to the first tooth may be shorter and the removed length is substituted by a surface interbridging the two surfaces, forming a third surface 433n. The third surface 433n may be lying in a direction intersecting the optical axis of the device, such as for instance in a direction perpenducular to the optical axis of the device.

The peripheral element 440 is illustrated to be equivalent to the peripheral element 340 described with reference to FIG. 3 but may be, in other embodiments, equivalent to e.g. the peripheral element 240 described with reference to FIG. 2.

Further, it will be appreciated that the optical device may include several truncated teeth, in several different positions, such as for example the tooth located closest to the central portion, the two teeth located closest to the central portion 420, a tooth located closest to the peripheral element 440 or any tooth in the middle of the Fresnel portion 430.

It will also be appreciated that the number of teeth shown in FIG. 4, and in other figures of the present specification, may not be limited to the number shown in the figures. The Fresnel portion may include any number of teeth. Further, the truncation can be on the part of a tooth extending outwards and/or inwards the Fresnel portion 430. The truncation can be of different levels and do not have to be shared among a possible multitude of truncated teeth 433n.

Figure 5:
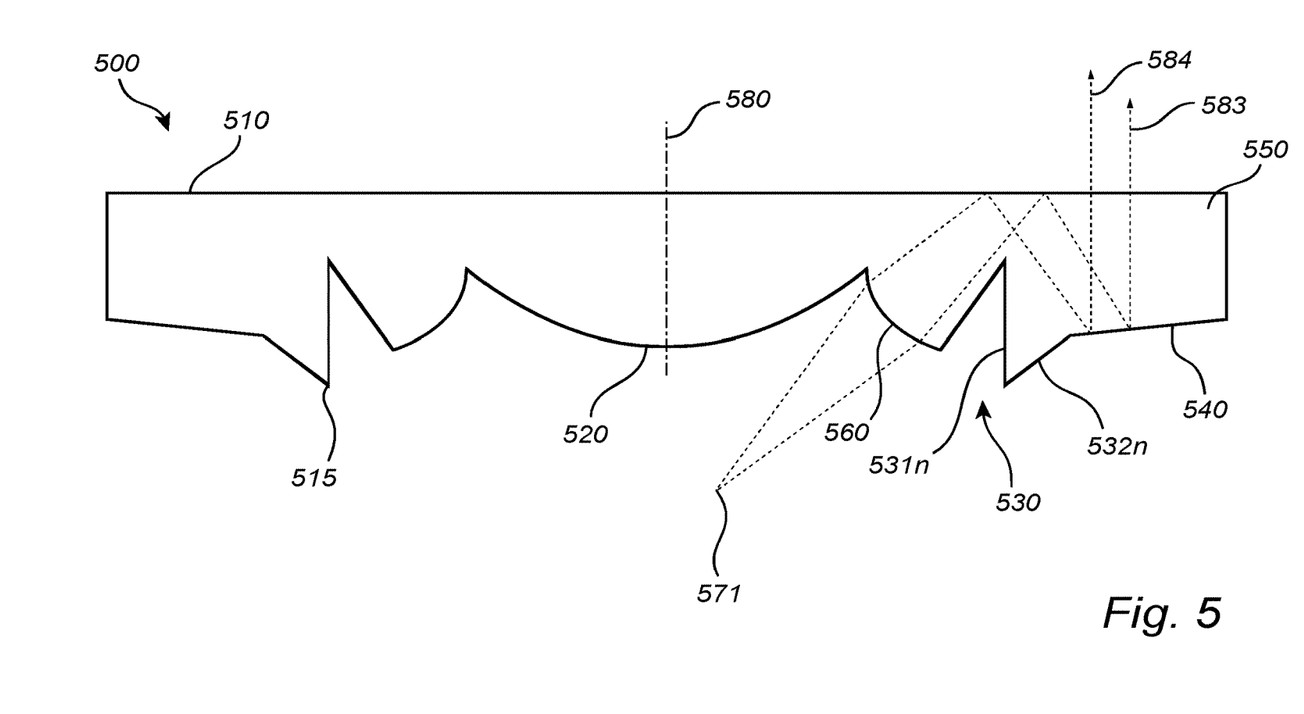
FIG. 5 is a schematic illustration of an optical device in which the source surface comprises a convex portion according to an embodiment.

FIG. 5 shows a schematic illustration of an optical device 500 with light rays traced for explanatory purposes. A light source 571 is positioned in a non-centered position, i.e. not at a centre position relative to the lens 500. The illustrated device 500 includes two opposing surfaces that delimit a lens body 550, a first surface 515 and a second surface 510.

The first surface 515 is illustrated with four portions, namely a central portion 520, a Fresnel portion 530, a peripheral element 540 and a convex portion 560. The central portion 520 may be centred at the optical axis 580 of the device (or an axial direction of the lens body). The convex portion 560 is arranged radially outwards from the central portion 520. The Fresnel portion 530 is arranged radially outwards from the convex portion 560 such that the convex portion is located between the central portion 520 and the Fresnel portion 530. Further, the peripheral element 540 is arranged radially outwards from the Fresnel portion 530. The central portion 520 is illustrated as a convex surface.

The convex portion 560 is illustrated as a leaning convex surface interbridging the central portion 520 and the Fresnel portion 530. The Fresnel portion 530 is in the present cross section illustrated by a jagged appearance with several teeth extending from the lens. A tooth provides two surfaces, a first surface 531n of a tooth facing the axis of the lens and a second surface 532n of a tooth facing the edge of the lens. The first surface 531n of a tooth may be illustrated as parallellparallel (or approximately parallel) to the optical axis 580 and the second surface 532n of a tooth may be illustrated as leaning with respect to the optical axis 580. The peripheral element 540 is illustrated as an extension of the second surface 510 in a radial direction (possibly extending towards the first surface 515 with an angle from a plane perpendicular to the optical axis).

In the design shown in FIG. 5, light (or light rays) 583, 584 emitted from the light source 571 diverge while reaching the convex portion 560 at which light is refracted into the lens body 550. After refraction at the convex portion 560, the light rays 583, 584 propagate in a convergent, collimated (or less diverging) manner in a direction towards the forward surface 510. At the forward surface 510, the light 583, 584 are reflected by total inner reflection and directed towards the peripheral element 540. At the peripheral element 540, the light rays 583, 584 are directed along the optical direction, i.e. to coincide with the light reflected at the teeth such that they together form a collimated output beam.

Figure 6:
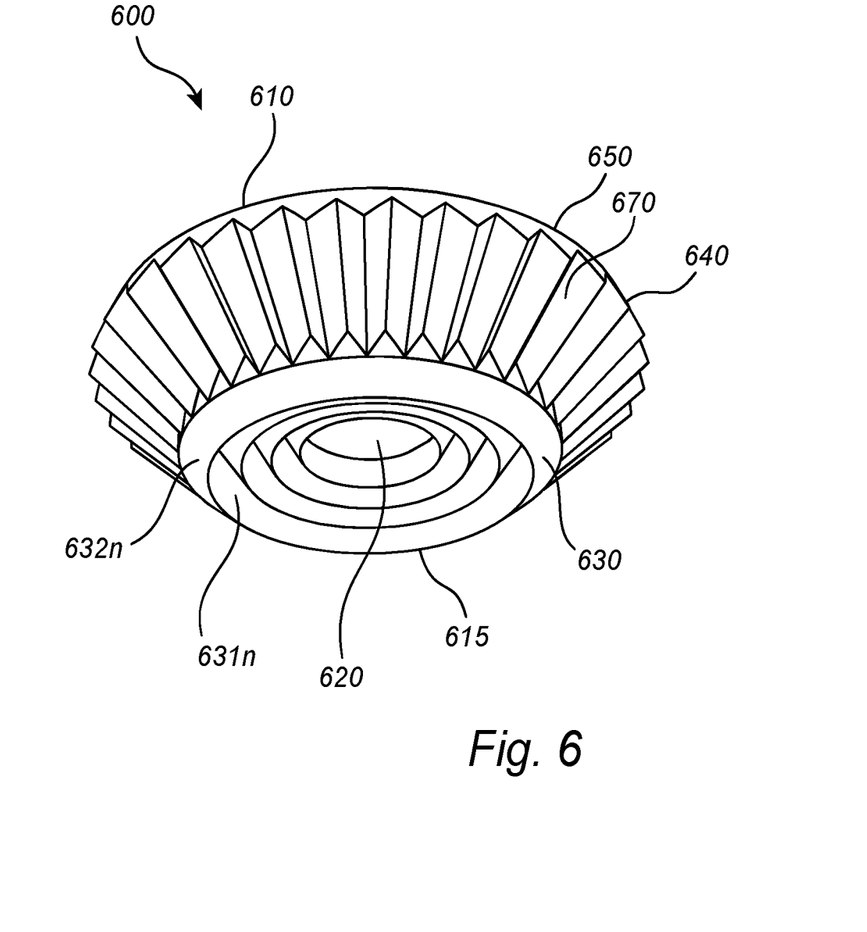
FIG. 6 is a perspective view of an optical device in which the peripheral element comprises grooves, according to an embodiment.

FIG. 6 shows a schematic illustration in perspective of an optical device 600.

The device 600 includes a central portion 620, a Fresnel portion 630, a peripheral element 640, grooves 670 and a lens body 650. The central portion 620, the Fresnel portion 630 and the peripheral element 640 are arranged on the illustrated side of the lens body 650. The peripheral element 640 has a multitude of grooves 670 in a direction extending radially from the centre of the lens body 650. The optical device 600 shown in FIG. 6 may be equivalent to the Fresnel lens 300 described with reference to FIG. 3 except that the peripheral element 340 has a different shape.

The optical device 600 includes two opposing surfaces that delimit a lens body 650, a first surface 615 and a second surface 610. The first surface 615 includes three portions, namely a central portion 620, a Fresnel portion 630 and a peripheral element 640. The central portion 620 is centred with the optical axis of the device (or an axial direction along which the structure or the lens body of the optical device 600 extends). The Fresnel portion 630 is arranged radially outwards from the central portion 620 and the peripheral element 640 is arranged radially outwards from the Fresnel portion 630 such that the Fresnel portion 630 is arranged between the central portion 620 and the peripheral element 640.

The central portion 620 may be a convex surface. The Fresnel portion 630 is in the present cross section illustrated by a jagged appearance with several teeth extending from the lens. A tooth provides two surfaces, a first surface 631n of a tooth facing the axis of the lens and a second surface 632n of a tooth facing the edge of the lens. The first surface 631n of a tooth may be parallellparallel (or approximately parallel) with the optical axis and the second surface 332n of a tooth may be leaning with respect to the optical axis.

In the embodiment shown in FIG. 6, the peripheral element 640 is an extension of the second surface 610 in a radial direction (extending towards the first surface 615 at a certain angle from a plane perpendicular to the optical axis). The surface of the peripheral element 640 further comprises grooves 670 in a direction extending from the axis of the device. Light reaching the grooves 670 from within the lens body 650 (i.e. from the interior of the lens body) may be reflected at both surfaces of a groove, so that the total effect may be reflection similar to specular reflection of a metalized surface. The grooves 670 may have different depth, width and length in the peripheral element 640, and these geometrical properties may also vary with position. In one particular embodiment, the grooves may comprise two flat surfaces that may be essentially perpendicular to each other, but other grooves shapes are possible.

Rays traced in the above described figures do not necessarily represent all light, but represent examples for explanatory purposes.

While specific embodiments have been described, the skilled person will understand that various modifications and alterations are conceivable within the scope as defined in the appended claims.

Summarizing, an optical device that allows the usage of an extended light source in a more compact device is provided. The optical device may be configured to collimate light of a light source 270 along an optical direction. The optical device 200 may comprise a source surface 215, a forward surface 210, a lens body 250 and a peripheral element 240. The source surface is arranged to receive light and may comprise a central portion 220 and a Fresnel portion 230. The Fresnel portion includes at least one tooth 233n for deflecting light. The forward surface is arranged to output, along the optical direction, at least the deflected light into a collimated light. The source surface and the forward surface delimit the lens body. The peripheral element may be arranged to reflect light internally reflected at the forward surface by total inner reflection towards the optical direction to contribute to the collimated light.

The invention claimed is:

1. A lighting device comprising:
    an extended light source being arranged for emitting light from both centered and non-centered positions;
    an optical device configured to collimate light of said light source along an optical direction, said optical device comprising:
        a source surface arranged to receive light, wherein said source surface comprises a central portion and a Fresnel portion including at least one tooth for deflecting light;
        a forward surface arranged to output at least the deflected light from the Fresnel portion into a collimated light along said optical direction;
        a lens body delimited by said source surface and said forward surface; and
        a peripheral element arranged to reflect light that originates from the non-centered position and that is internally reflected by total inner reflection at said forward surface towards said optical direction to contribute to said collimated light,
        wherein the peripheral element surrounds at least a portion of the Fresnel portion to collimate light that is not collimated by the Fresnel portion.

2. The lighting device according to claim 1, wherein said peripheral element is configured to reflect light having been deflected, without total inner reflection, at said Fresnel portion and reflected at the forward surface.

3. The lighting device according to claim 1, wherein said Fresnel portion is, relative to the optical direction, radially located between said central portion and said peripheral element.

4. The lighting device according to claim 1, wherein said central portion is located towards a center of said device and said peripheral element is located towards an edge of said device.

5. The lighting device according to claim 1, wherein said peripheral element further comprises a metalized surface configured to reflect light along said optical direction.

6. The lighting device according to claim 1, wherein said peripheral element is an integrated part of said lens body.

7. The lighting device according to claim 1, wherein said peripheral element is external to the lens body.

8. The lighting device according to claim 1, wherein said peripheral element comprises grooves arranged to reflect light internally reflected at said forward surface by total inner reflection within said lens body.

9. The lighting device according claim 1, wherein said Fresnel portion comprises at least one tooth having a truncated part.

10. The lighting device according claim 1, wherein at least one truncated tooth is located into said lens body.

11. The lighting device according claim 1, wherein said source surface further comprises:
    a convex portion radially arranged relative to the optical direction between said central portion and said Fresnel portion, wherein said convex portion is arranged to collimate light of a light source along a second optical direction such that said light is directed along said optical direction by reflection against said forward surface and at said peripheral element.

12. The lighting device according to claim 1, wherein said light source is located closer to said source surface than said forward surface of said optical device.

13. The lighting device according to claim 12, wherein said light source is one from the group comprising: a light emitting diode, an organic light emitting diode, a compact fluorescent lamp, an incandescent light source and a halogen light source.

14. An optical device configured to collimate light of a light source along an optical direction, said optical device comprising:
    a source surface arranged to receive light from the light source, wherein said source surface comprises a central portion and a Fresnel portion including at least one tooth for deflecting light;
    a forward surface arranged to output at least the deflected light from the Fresnel portion into a collimated light along said optical direction;
    a lens body delimited by said source surface and said forward surface; and
    a peripheral element arranged to reflect light that is internally reflected by total inner reflection at said forward surface towards said optical direction to contribute to said collimated light,
    wherein the peripheral element surrounds at least a portion of the Fresnel portion to collimate light that is not collimated by the Fresnel portion.

15. The optical device according to claim 14, wherein said Fresnel portion is radially located between said central portion and said peripheral element.

16. The optical device according to claim 14, wherein said peripheral element completely surrounds said Fresnel portion along a periphery of said Fresnel portion.

17. The optical device according to claim 14, wherein said peripheral element is external to the lens body.

18. The optical device according to claim 14, wherein said peripheral element comprises grooves arranged to reflect light internally reflected at said forward surface by total inner reflection within said lens body.

19. A method to collimate light of a light source along an optical direction, said method comprising:
- receiving light from the light source, the light being received at a source surface of an optical device, wherein said source surface comprises a central portion and a Fresnel portion including at least one tooth for deflecting light;
- outputting, at a forward surface of said optical device, at least the deflected light from the Fresnel portion into a collimated light along said optical direction, wherein a lens body is delimited by said source surface and said forward surface; and
- reflecting, at a peripheral element of said optical device, light that is internally reflected by total inner reflection at said forward surface towards said optical direction to contribute to said collimated light,
- wherein the peripheral element surrounds at least a portion of the Fresnel portion to collimate light that is not collimated by the Fresnel portion.

20. The method according to claim 19, wherein said Fresnel portion is radially located between said central portion and said peripheral element.

* * * * *